June 30, 1936.  H. B. PEARSON ET AL  2,045,793
TOWING LIFT
Filed Feb. 20, 1935  3 Sheets-Sheet 1

INVENTORS.
Howard B. Pearson,
Newton J. England,
James A. Madden.
BY Townsend and Loftus
ATTORNEYS.

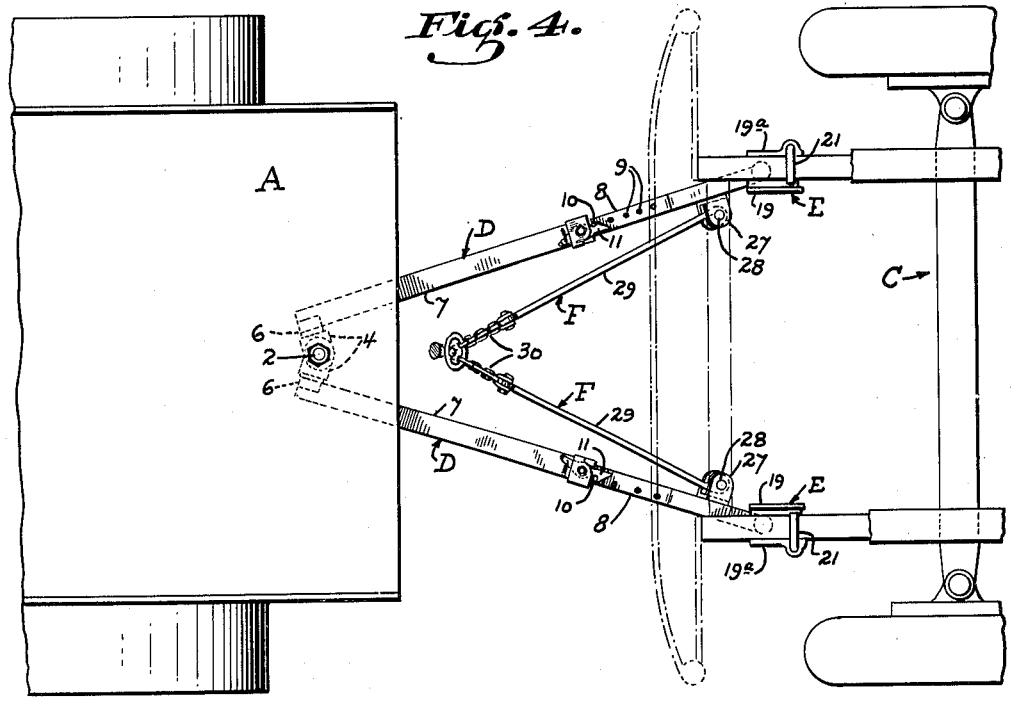
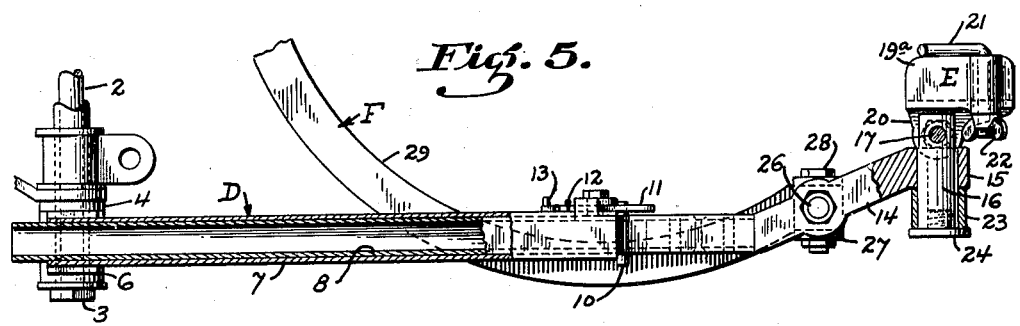
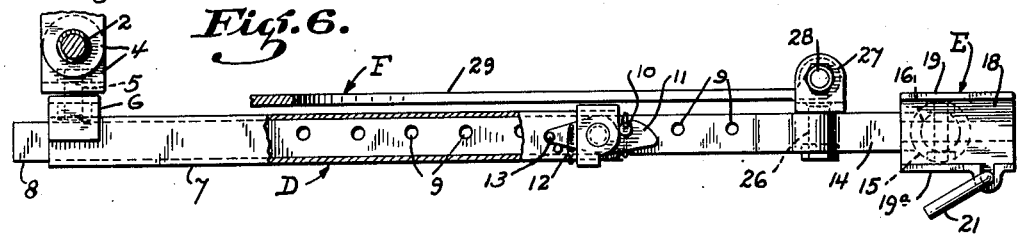

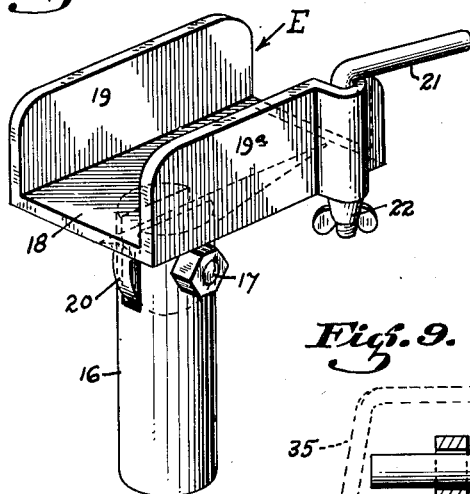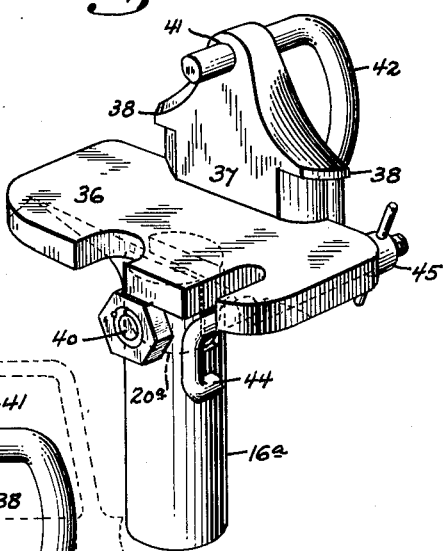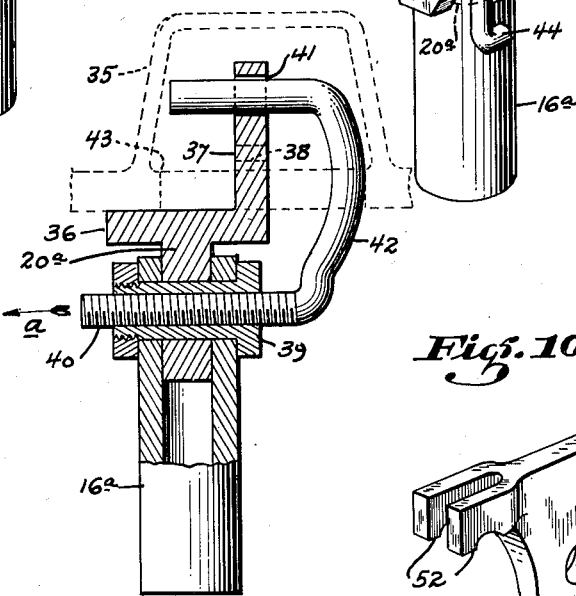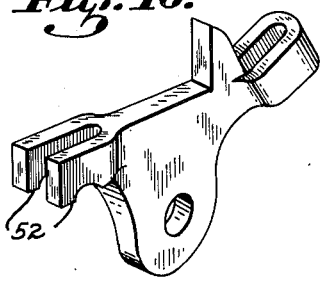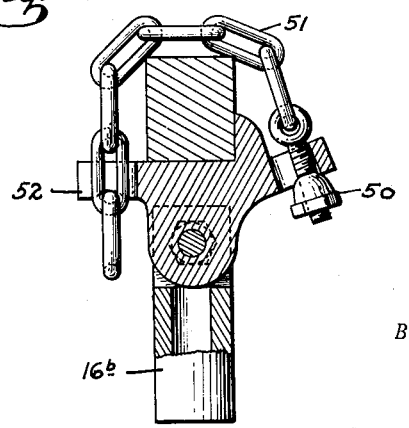

Patented June 30, 1936

2,045,793

UNITED STATES PATENT OFFICE 2,045,793

TOWING LIFT

Howard B. Pearson, Newton J. England, and James A. Madden, San Francisco, Calif.

Application February 20, 1935, Serial No. 7,456

12 Claims. (Cl. 214—86)

This invention relates to a vehicle towing and lifting apparatus, and more particularly, to a device which is adapted to form a connection between the towing car and the wrecked or disabled motor vehicle whereby the disabled vehicle may be towed either from the front or rear end and held in an elevated position by a crane on the towing car while being towed.

The object of the present invention is generally to improve and simplify the construction and operation of devices of the character described; to provide a towing and lifting device which may be quickly and rigidly attached either to the front or rear end of a disabled motor vehicle, or the like; to provide a towing and lifting device which may be readily attached to the frame, springs, cross members, etc., of cars of different makes and which is adjustable to take care of spans of varying width; to provide a towing and lifting device which is adjustable in length to permit it to be extended in under the modern low built motor car with its skirted fenders, overhanging trunk racks, bumpers, etc., and in such a manner as to clear the overhanging parts and prevent damage thereto when lifting and towing; and, further, to provide a towing and lifting device which is actuated by the crane of the towing car and which may be raised and folded against the rear end of the towing car when not required.

The towing lift is shown by way of illustration in the accompanying drawings, in which—

Fig. 4 is a plan view of Fig. 1;

Fig. 5 is an enlarged side elevation of one of the towing arms, said side elevation being partially in section;

Fig. 6 is a plan view of Fig. 5, said view being also partially in section;

Fig. 7 is a perspective view of one of the shoes;

Fig. 8 is a perspective view of a modified form of shoe;

Fig. 9 is a central vertical section of the shoe shown in Fig. 8;

Fig. 10 is a perspective view of another modified form of shoe.

Fig. 11 is a cross section showing the manner in which the shoe shown in Fig. 10 is supported and applied.

Figure 1:
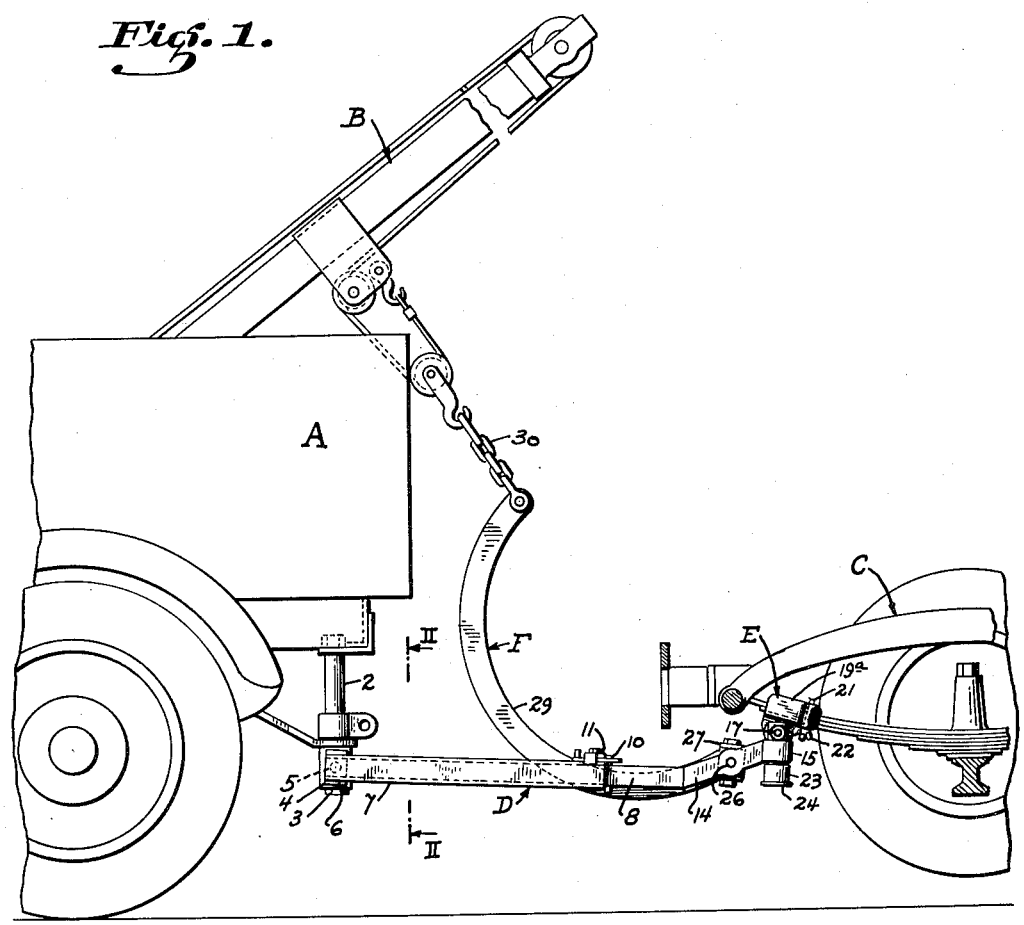
Fig. 1 is a side elevation of the towing and lifting device, showing the manner in which it is attached to the towing car and the car to be towed.
Figure 2:
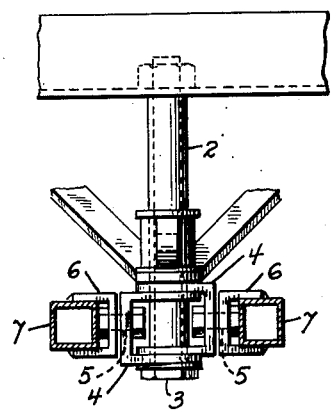
Fig. 2 is an enlarged cross section on line II—II of Fig. 1, showing the universal connection formed between the towing arms and the post on the towing car.
Figure 3:
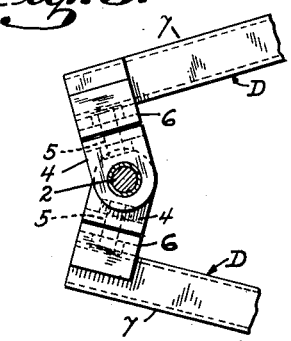
Fig. 3 is a plan view of Fig. 2.

Refering to the drawings in detail, and particularly Fig. 1, A indicates the rear end of a towing car, B a crane mounted thereon, and C the front end of a disabled car to be lifted and towed.

The lifting and towing device forming the subject matter of this invention is permanently attached to the towing car and consists, primarily, of a pair of extensible towing arms D attached at one end to the towing car and having a pair of shoes E on their outer ends, whereby the car to be lifted and towed is secured, and a pair of curved arms F attached adjacent to the outer ends of the towing arms whereby connection is made with the crane B to lift and maintain one end of the car in an elevated position while being towed. The detailed construction of the towing and lifting device is as follows:

Permanently secured to the rear end of the towing car is a downwardly extending post 2, which terminates in a nut or collar 3. Supported by said collar and mounted to swing about the longitudinal axis of the post is a pair of clevis members 4—4 and pivoted to said clevis members to swing at right angles thereto, as indicated at 5—5, are clevis members 6—6 in which are rigidly secured by welding, or otherwise, tubular members 7—7 which form portions of the towing arms D, as will hereinafter be more fully described. The clevis members 4—4 and 6—6 pivoted as here illustrated form universal connections which permit swinging movement of the towing arms vertically, horizontally and in any direction desired.

Referring to Figs. 2, 4, 5 and 6, it will be noticed that the tubular arms 7 are square in cross section and that there is a second tube or arm 8 mounted therein which is free to be extended or retracted as the case may be. The tubes or arms 8 are also square in cross section so that rotational movement of one tubular arm with relation to the other is prevented. The tubular arms 8 are perforated at spaced intervals, as shown at 9, to receive a pin 10. The outer ends of the tubular arms 7 have a latch 11 pivoted thereon and these latches engage the pins 10; springs, such as shown at 12, being provided for this purpose. Disengagement of the latches and pins is secured by pulling on an extension 13 against the tension of the springs.

The tubular arms 7 and 8 form towing and spacing arms. They also form supports for the shoes E, which will hereinafter be described.

The outer ends of the telescoping tubular arms 8 have a casting 14 secured therein, said castings being secured by riveting, welding, or otherwise. These castings terminate in socket-shaped ends 15 to receive a pin or shank 16 to which the shoe E is pivotally attached as shown at 17. There are different forms of shoes employed. The type shown in Fig. 7 will first be described.

It consists of a channel-shaped member having a base 18 and a pair of side flanges 19 and 19a. The base is provided with a lug 20 and this lug is free to swing about the pivot pin 17. One of the side flanges is recessed to receive a hook-shaped pin 21. This pin is free to swing so as to lie parallel with the side flange 19a or to be swung crosswise of the flanges for the purpose of gripping the springs of the car to be towed, and when swung to this position the hook-shaped arm may be pulled down against the spring by a nut 22. The shoe shown in Fig. 7 is applied to the springs of a car, as shown in Figs. 1 and 4, and when applied is rigidly secured and clamped to the springs by the hook-shaped pins 21 and the nuts 22 cooperating therewith. The shoes when thus applied are free to swing vertically about the pivots 17 and they are also free to swing in a horizontal plane as the pins 16 swivel in the sockets 15. The pins 16 are secured against endwise removal from the sockets by sleeve washers 23 and a bottom nut 24. The sleeve washers may be transferred to the upper side of the socket 15, if it is desired to raise the shoes, or they may be positioned as shown in Fig. 5. When the shoes are attached to the springs of the vehicle to be towed as described, the tubular arms 7 and 8 form a towing connection between the shoes and the towing car, the pull being taken by the latches 11 engaging the pins 10.

Means must also be provided for elevating the end of the disabled vehicle which is engaged by the shoes. This is accomplished in the present instance by journaling pivot pins 26 in the castings 14. These pins terminate in fork-shaped shackles 27, see Figs. 5 and 6, and the shackles, in turn, form pivots 28 for a pair of curved arms 29, said arms forming a connection between the towing arms and the crane by means of the chain indicated at 30, see Figs. 1 and 4. The provision of the curved arms permits the pull exerted by the crane to be directed to the outer ends of the towing arms and the shoes to which the disabled car is secured. Furthermore, it provides a clearance between the overhanging parts of the car to be towed, such as bumpers, skirted fenders, tire racks, and so on, and thus prevents damage to these parts when the car is lifted and towed.

Attachment may be made with this device with the front or rear end of the disabled car to be towed. The modern automobile provides comparatively little clearance between the road surface and the bottom of the car and many of them are, furthermore, provided with skirted fenders projecting aprons and with a long overhang due to trunks, bumpers, and other streamline effects, and some of them are provided with independently sprung wheels commonly known as "knee action" axles. These modernly constructed cars present a difficult problem when raising and towing is to be considered.

The towing and lifting device here described has been constructed to take care of these problems and is accomplished by using the curved lifting arms F and by providing the universally mounted extensible towing arms D. In most instances the type of shoe shown in Fig. 7 can be applied as these shoes may be attached not only to the front or rear springs, but they may also be attached to many other parts of a car, such as frame ends, bumper arms, knee action cross bars, etc.

When attached to the conventional type of springs, or any part of the towed car that runs parallel of the towed car, the hook-shaped ends of the members 21 are placed toward the towed car, thus causing the finger or hook to always point toward the inside of the towed car as the towed car is being raised on the crane. The action of the curved arms F causes the shoes to move toward each other thereby holding the outside flanges of the shoes firmly against the part of the towed car to which they are attached.

Where a car is equipped with knee action axles there is, usually, a helical spring for each front wheel. These springs are supported at their lower ends by cups of a general shape, such as indicated in dotted lines at 35 see Fig. 9. Where the knee action cups are employed, a shoe of the type shown in Figs. 8 and 9 is required. This type of shoe consists of a base portion 36, having a right angular upwardly extending portion 37 with projecting shoulders 38. The lower face of the base portion is provided with a lug 20a and this pivots about a bushing 39 carried by the pin indicated at 16a. The bushing 39 is internally threaded to receive a pin 40. This pin is bent upwardly and extends through a perforation 41 formed in the member 37. The bushing 39 is provided with heads at opposite ends that may be grasped by a wrench and rotated. When it is rotated in one direction the pin 40 will move in the direction of arrow a and the shoe as a whole is contracted. In this position it is inserted within the knee action cup, as shown in Fig. 9, then by rotating the bushing in the opposite direction the pin 40 will reverse its movement and the shoe will expand; that is, the portion indicated at 42 will engage one inner wall of the knee action cup and thus force the base member 36 and the member 37 in the opposite direction. The shoulders 38 will thus engage an internal annular flange 43 formed within the knee action cup and the shoe will thus become rigidly secured to the cup. The manner of applying the shoe to a car equipped with knee action axles is thus simply and quickly accomplished and the attachment when made is rigid and secure.

A hooked finger 44 is also carried by the shoe and it is only used when it is desired to attach the shoe to a channel-shaped frame. In that instance the horizontal base 36 of the shoe is placed against the bottom of the frame and the finger 44 is hooked over the lower channel and is there tightened by drawing up on the nut shown at 45.

The type of shoe shown in Figs. 10 and 11 is particularly intended for attachment to knee action cars employing a dummy axle. This shoe can also be attached to any part running crosswise, or nearly so, of the towed car. It is applied by releasing the nut 50, throwing the chain 51 over the part to which the shoe is to be attached and then latching the chain in the hooked end of the shoe, as shown at 52, and then tightening the nut shown at 50; thereby securing the chain tightly around the axle or other part to which the shoe is attached. This shoe is pivoted in the upper end of a pin 16b in the same manner as the other shoes.

In actual practice when it is desired to attach the towing and lifting device to a disabled car, it is only necessary to back the towing car toward the end of the disabled vehicle as shown in Fig. 1. The latches 11 are disengaged. The telescoping sections 8 of the towing arms are extended by sliding them outwardly. The proper shoes are placed in the sockets 15 and are attached to the springs of the disabled vehicle, or the frame or other most convenient part, and are there rigidly secured. The pins 10 are then inserted in the proper hole and the power cable is drawn in until the latches 11 engage the pins. In this position the lifting arms should clear the bumpers or overhanging parts and, if they do not, the proper adjustment can be made by again removing the pins 10 and either extending or retracting the telescoping towing arms. The crane is then operated to lift the towed car. The curved arms allow ample clearance for all projecting parts and at the same time they take the weight of the tow in the direct line from the cable pulleys to a point adjoining the shoes where they are attached to the towed car. The car may thus be raised to any elevation desired and is then ready to be towed.

The universal connection between the curved lifting arms F and the towing arms permits the lifting arms to assume any required angle. The shoes secured to the tow car are also universally connected to the towing arms and will automatically assume the proper angle and the same may be said of the towing arms themselves, as they are universally connected to the post of the towing car. All members are thus self-aligning and automatically adjust themselves to take the proper strains and loads. This permits the device as a whole to be attached to the towed car at points where its weight naturally rides and, therefore, no part of the towed car is placed in an unnatural bind or strain which might result in disfigurement or damage to the towed car.

The towed car will travel perfectly even on the shortest turns as it rides similar to a two-wheeled trailer and therefore can be backed and maneuvered in any way desired and without any danger of side-sway.

The towing and lifting device is quickly and easily attached and just as quickly released, and when the towing device is not required it may be swung upwardly against the rear of the towing car and secured.

While the arms F have been shown and described as curved arms, other shapes or offset forms may be employed as the important feature is that of providing an arm which is so shaped that it will clear the projecting parts of the vehicle. When a car is being towed, it will be understood that most of the pull will be transmitted through the crane and the curved arms to the point of attachment indicated at 26 and that the pull transmitted through the pin 2 and the towing arms will, accordingly, be comparatively small. Hence, while the arms D are termed towing arms, it should also be understood that they function as spacing arms as they maintain a predetermined spacing between the towing car and the car being towed.

While certain features of the present invention are more or less specifically described, we wish it understood that various changes may be resorted to within the scope of the appended claims. Similarly, that the materials and finish of the several parts employed may be such as the manufacturer may decide, or varying conditions or uses may demand.

Having thus described our invention, what we claim and desire to secure by Letters Patent is:—

1. The combination with a towing car having a lifting crane, of a pair of arms attached to the car and extending rearwardly therefrom, said arms at the point of attachment being free to swing horizontally and vertically independently of each other, detachable means on the outer ends of said arms adapted to be secured to a car to be towed, said securing means and arms forming a towing connection, and curved arms connected with the outer ends of the arms whereby the car to be towed may be lifted by the crane.

2. The combination with a towing car having a lifting crane, of a pair of arms attached to the car and extending rearwardly therefrom, said arms at the point of attachment being free to swing horizontally and vertically, means on the outer ends of said arms adapted to be secured to a car to be towed, said securing means and arms forming a towing connection, a curved arm universally connected at a point adjacent the outer end of each of the first-named arms, and means connected with the opposite ends of the curved arms whereby the car to be towed may be lifted by the crane.

3. The combination with a towing car having a lifting crane, of a pair of arms attached to the car and extending rearwardly therefrom, said arms at the point of attachment being free to swing horizontally and vertically independently of each other, means for shortening or lengthening said arms independently of each other, independent means on the outer end of each arm adapted to be secured to a car to be towed, said securing means and arms forming a towing connection, an offset arm connected at one end with the outer end of each towing connection, and means connected with the opposite end of each offset arm whereby the car to be towed may be lifted by the crane.

4. The combination with a towing car having a lifting crane, of a pair of arms attached to the car and extending rearwardly therefrom, said arms at the point of attachment being free to swing horizontally and vertically independently of each other, a telescoping extension carried by each of said arms to lengthen or shorten the arms independently of each other, means for securing the extensions when adjusted, means on the outer ends of the extension adapted to be independently secured to a car to be towed, said securing means and arms forming a towing connection, an offset arm connected at one end with the outer end of each towing connection, and means connected with the opposite end of each offset arm whereby the car to be towed may be lifted by the crane.

5. The combination with a towing car having a lifting crane, of a pair of arms attached to the car and extending rearwardly therefrom, said arms at the point of attachment being free to swing horizontally and vertically independently of each other, a shoe on the outer end of each arm adapted to be independently secured to a car to be towed, a universal connection between each shoe and arm, an offset arm connected at one end with the outer end of each towing connection, and means connected with the opposite end of each offset arm whereby the car to be towed may be lifted by the crane.

6. The combination with a towing car having a lifting crane, of a pair of arms attached to the car and extending rearwardly therefrom, said arms at the point of attachment being free to swing horizontally and vertically, a shoe on the outer end of each arm adapted to be secured to a car to be towed, a universal connection between each shoe and arm, a curved arm universally connected at a point adjacent the outer end of each of the first-named arms, and means connected with the opposite ends of the curved arms whereby the car to be towed may be lifted by the crane.

7. A towing and lifting device comprising a pair of towing arms adapted to be attached at a common point to a towing car, the outer ends of the arms being free to spread and to be swung vertically, a shoe pivoted to the outer ends of the arms, means for securing each shoe to a car to be towed, an offset arm connected at one end with the outer end of each towing connection, and means connected with the opposite end of each offset arm whereby the car to be towed may be lifted by the crane.

8. A towing and lifting device comprising a pair of towing arms adapted to be attached at a common point to a towing car, the outer ends of the arms being free to spread and to be swung vertically, a shoe on the outer end of each arm, a universal connection between each shoe and arm, means on each shoe for securing it to a car to be towed, and means adjacent the outer ends of the arms whereby they are connected to a lifting crane on the towing car, said means having a universal connection with each arm.

9. A towing and lifting device comprising a pair of towing arms adapted to be universally attached at a common point to a towing car so that the outer ends of the arms will be free to swing in any direction, a shoe on the outer end of each arm, a universal connection between each shoe and arm, means on each shoe for securing it to a car to be towed, and means adjacent the outer ends of the arms whereby they are connected to a lifting crane on the towing car, said means having a universal connection with each arm.

10. The combination with a towing car having a lifting crane, of a pair of arms attached to the car and extending rearwardly therefrom, said arms at the point of attachment being free to swing horizontally and vertically independently of each other, means on the outer ends of said arms adapted to be secured to a car to be towed, a pivoted connection between each securing means and arm, an offset arm connected at one end with the outer end of each towing connection, and means connected with the opposite end of each offset arm whereby the car to be towed may be lifted by the crane.

11. The combination with a towing car having a lifting crane, of a pair of arms universally attached at a common point to the towing car and extending rearwardy therefrom, said arms at the point of attachment being free to swing horizontally and vertically, means on the outer ends of said arms adapted to be secured to a car to be towed, said securing means and arms forming a towing connection, an offset arm connected with each of the towing arms at the outer ends thereof, and means connected with the offset arms whereby the car to be towed may be lifted by the crane.

12. The combination with a towing car having a lifting crane, of a pair of arms attached to the car and extending rearwardly therefrom, each arm having an extensible bar, means on the outer end of each bar for securing the same to a car to be towed, means attached to the outer end of each bar whereby the car to be towed may be lifted by the crane, said bars being extensible when they are to be attached to a car and being retractible when attached to and lifted by the crane, adjusting means for limiting the retracting movement of the bars, and a latch on each arm engageable with said adjustable means to secure the bars against extension or retraction.

HOWARD B. PEARSON.
NEWTON J. ENGLAND.
JAMES A. MADDEN.